March 25, 1924. 1,487,783
D. S. KENNEDY
TYPOGRAPHICAL COMPOSING AND DISTRIBUTING MACHINE
Filed July 27, 1921 7 Sheets-Sheet 1

Fig.1.

INVENTOR
David S. Kennedy
BY
Rogers, Kennedy & Campbell ATTORNEYS

March 25, 1924.  1,487,783
D. S. KENNEDY
TYPOGRAPHICAL COMPOSING AND DISTRIBUTING MACHINE
Filed July 27, 1921   7 Sheets-Sheet 2

March 25, 1924. 1,487,783
D. S. KENNEDY
TYPOGRAPHICAL COMPOSING AND DISTRIBUTING MACHINE
Filed July 27, 1921   7 Sheets-Sheet 3

INVENTOR
David S. Kennedy
BY
Rogers, Kennedy & Campbell
ATTORNEYS

March 25, 1924. 1,487,783

D. S. KENNEDY

TYPOGRAPHICAL COMPOSING AND DISTRIBUTING MACHINE

Filed July 27, 1921  7 Sheets-Sheet 4

INVENTOR
David S. Kennedy
BY
Rogers, Kennedy Campbell ATTORNEYS

March 25, 1924. 1,487,783
D. S. KENNEDY
TYPOGRAPHICAL COMPOSING AND DISTRIBUTING MACHINE
Filed July 27, 1921  7 Sheets-Sheet 5

March 25, 1924.  1,487,783
D. S. KENNEDY
TYPOGRAPHICAL COMPOSING AND DISTRIBUTING MACHINE
Filed July 27, 1921   7 Sheets-Sheet 7

INVENTOR
David S. Kennedy
BY
Rogers, Kennedy & Campbell
ATTORNEYS

Patented Mar. 25, 1924.

1,487,783

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL COMPOSING AND DISTRIBUTING MACHINE.

Application filed July 27, 1921. Serial No. 487,824.

*To all whom it may concern:*

Be it known that I, DAVID S. KENNEDY, a citizen of the United States, residing at Brooklyn, in the county of Kings and State of New York, have invented certain new and useful Improvements in Typographical Composing and Distributing Machines, of which the following is a specification, reference being had therein to the accompanying drawings.

This invention relates to typographical machines, such as linotype machines of the general organization represented in U. S. Letters Patent to O. Mergenthaler, No. 436,532, wherein by the manipulation of a keyboard circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started.

The present improvements are intended to provide for the use in the above machines of a vastly greater number of matrix characters than it has previously been possible to employ. Thus, the matrix font generally employed in the commercial linotype machine comprises but ninety different characters (i. e. characters having different values); whereas the matrix font which it is proposed to employ herein comprises over two thousand totally different characters. These improvements have been made with particular reference to the requirements of the Japanese language which heretofore, on account of the great number of characters needed, has necessitated the use of hand-set type for the composition of printed matter.

The general scheme is briefly as follows: The matrices of a complete font are divided equally among four different magazines, each having one hundred twenty six channels wherein like matrices are stored in columns as usual. The matrices in each column are formed with four different characters, two on one edge and two on the other, thus making up five hundred four characters for each magazine, or two thousand sixteen characters for all four magazines,—this total number of characters being sufficient for Japanese composition. The release of the matrices from the several magazines is controlled by a keyboard comprising only as may finger keys as there are channels in an individual magazine, namely, one hundred twenty six, means being provided for operatively connecting said keyboard to one or another of the magazines as desired. Associated with the keyboard is an indicator mechanism which presents a plurality of sets of index characters, one set for each magazine, and this indicator mechanism is controlled automatically in such manner that, whenever the keyboard is connected to any desired magazine, the corresponding set of index characters is brought into reading relation to the respective finger keys. In this way, although the keyboard comprises a limited number of finger keys, the operator is advised at all times as to what keys should be actuated in selecting the proper matrices. That is to say, when the keyboard is connected to any selected magazine, the particular characters of the contained matrices are represented on the keyboard by the corresponding index characters, which appear in reading relation to the respective finger keys, so that the operator will know precisely what key to strike to bring down a matrix bearing the desired character. Then when the keyboard is subsequently connected to some other magazine, a new set of index characters (representative of the different set of matrix characters) is brought into reading relation to the finger keys to guide the operator in selecting the appropriate matrices. This change of index characters takes place automatically with each change of magazine. The index characters of each set are arranged in groups of four for each finger key, and this because each matrix is provided with four different characters, which are all subject to the control of the same finger key. The final selection of one or another of these four characters is determined and controlled by manually adjustable means which act upon the released matrices and assemble them in line at one of two levels and in reversed or unreversed position, according to the character to appear in print. After casting, the matrices are passed through a distributing apparatus which cooperates with all of the magazines simultaneously and restores the matrices thereto in their original or unreversed contion.

While, as above stated, the present improvements have been developed to meet the requirements of the Japanese language, it should be understood that they are equally useful in connection with other languages, such as Chinese, Burmese, Hebrew, Arabic, Syriac, Persian, etc., and even in connection with certain classes of work in English. In fact, the invention will be useful in any case where the matrix font comprises a greater number of characters than there are finger keys in the keyboard or where the keyboard is employed to control matrices having different values.

In the accompanying drawings, the improvements have been shown only in preferred form and by way of example and as applied to a particular style of machine, and it will be understood that many changes and variations in their form and mode of application may be made and still be comprised within the spirit of the invention. Generally speaking, it is to be understood that the invention is not limited to any specific form or adaptation except in so far as such limitations are specified in the claims.

Referring to the drawings.

Figures 2, 2A:
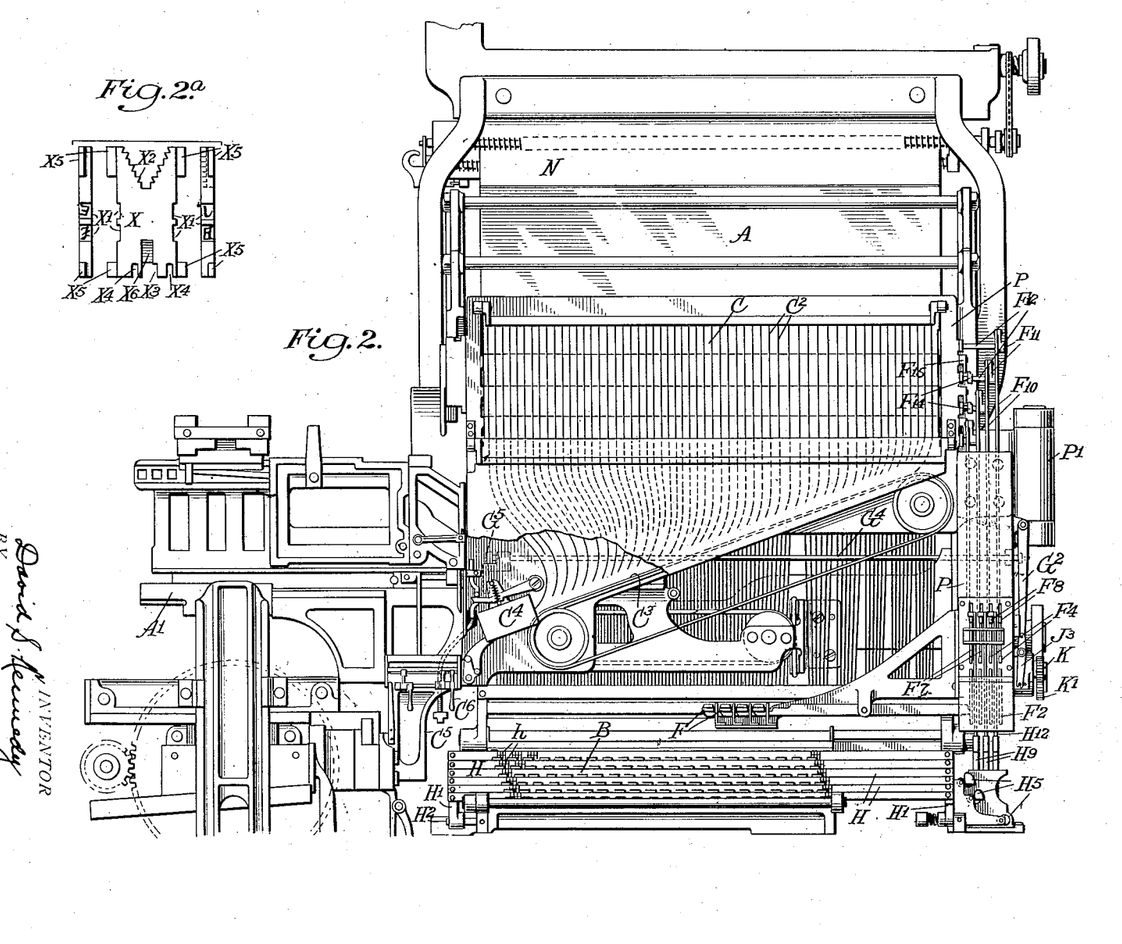
Fig. 2 is a front view thereof, with the upper portion of the distributing apparatus omitted.
Fig. 2a illustrates one of the matrices, which is shown in different positions.

The matrices herein employed are of the Janus-faced variety. As shown in Fig. 2a, each matrix X is formed with four different characters $X^1$, two on one edge and two on the other, and any selected one of which may be brought into use, as required. For distributing purposes, the matrix is provided at its upper end with a tooth combination $X^2$ and at its lower end with a separating notch $X^3$ together with a pair of sorting notches $X^4$. The notch $X^3$ is located in the same position on all of the matrices of the font, acting by its unsymmetrical location to control the separation of reversed from unreversed matrices; whereas the notches $X^4$ are arranged in different relative locations on matrices belonging to different magazines so as thus to sort the matrices into sets, one for each magazine. The tooth combinations $X^2$ are the same for the matrices of each set but of course differ from each other as between unlike matrices of the same set so as to distribute them according to character. The matrices are also provided with the customary projecting ears $X^5$ and bevelled notches $X^6$.

In the present arrangement, the matrices of the complete font are divided into four different sets and are stored in as many different stationary magazines A, each having one hundred twenty six grooved channels wherein like matrices are stored in columns in the usual way. The matrix font thus presents two thousand sixteen different characters, all available for immediate use. It is evident that, by changing the number of magazines, or the number of channels in each magazine, or the number of characters on each matrix, the total number of matrix characters may be increased or decreased to any desired extent. The particular number above indicated has been selected merely by way of example and as adequate for composition in the Japanese language.

As the matrices are released from the magazines (Fig. 5), they pass through the entrance throats $C^1$ into the vertical channeled raceway C, each throat (except the uppermost one, which does not require it) being provided with a pivoted flap $C^2$ to close the passage between it and the raceway when the corresponding magazine is not in use. From the raceway C, the matrices pass onto the inclined conveyer belt $C^3$ (Fig. 2) leading to the customary assembling elevator $C^5$. Arranged between the elevator $C^5$ and belt $C^3$ is the vertically adjustable chute $C^4$ formed with two channels, one straight or plain to permit the passage of the matrices therethrough without reversal, and the other rifled or twisted to effect the reversal of the matrices in their passage therethrough. Hence, by adjusting the chute $C^4$ to bring one or the other of its channels into operation, the matrices may be delivered to the assembling elevator in either reversed or unreversed position according as the characters on one edge or the other are desired. The chute and its manner of adjustment are precisely the same as presented in my prior Patent No. 1,153,499, so that no further description seems necessary. Since the matrices are formed with two superposed characters on each edge, further means must be provided for composing them at different levels in the assembling elevator. Such means are also well known (see Rogers Reissue Patent No. 13,489) and comprise a short rail or blade arranged at the entrance of the elevator and adapted to be projected into or withdrawn from the path of the incoming matrices by the operation of the handle $C^6$, so as to cause them to pass onto the upper or lower supporting rails within the elevator, as required. It will be seen, therefore, that whenever a matrix is released from a magazine, the particular character which is to appear in print may be brought into use by the adjustment of the chute $C^4$ or by the operation of the handle $C^6$, or both, according to the character desired.

Figures 5, 6, 7:
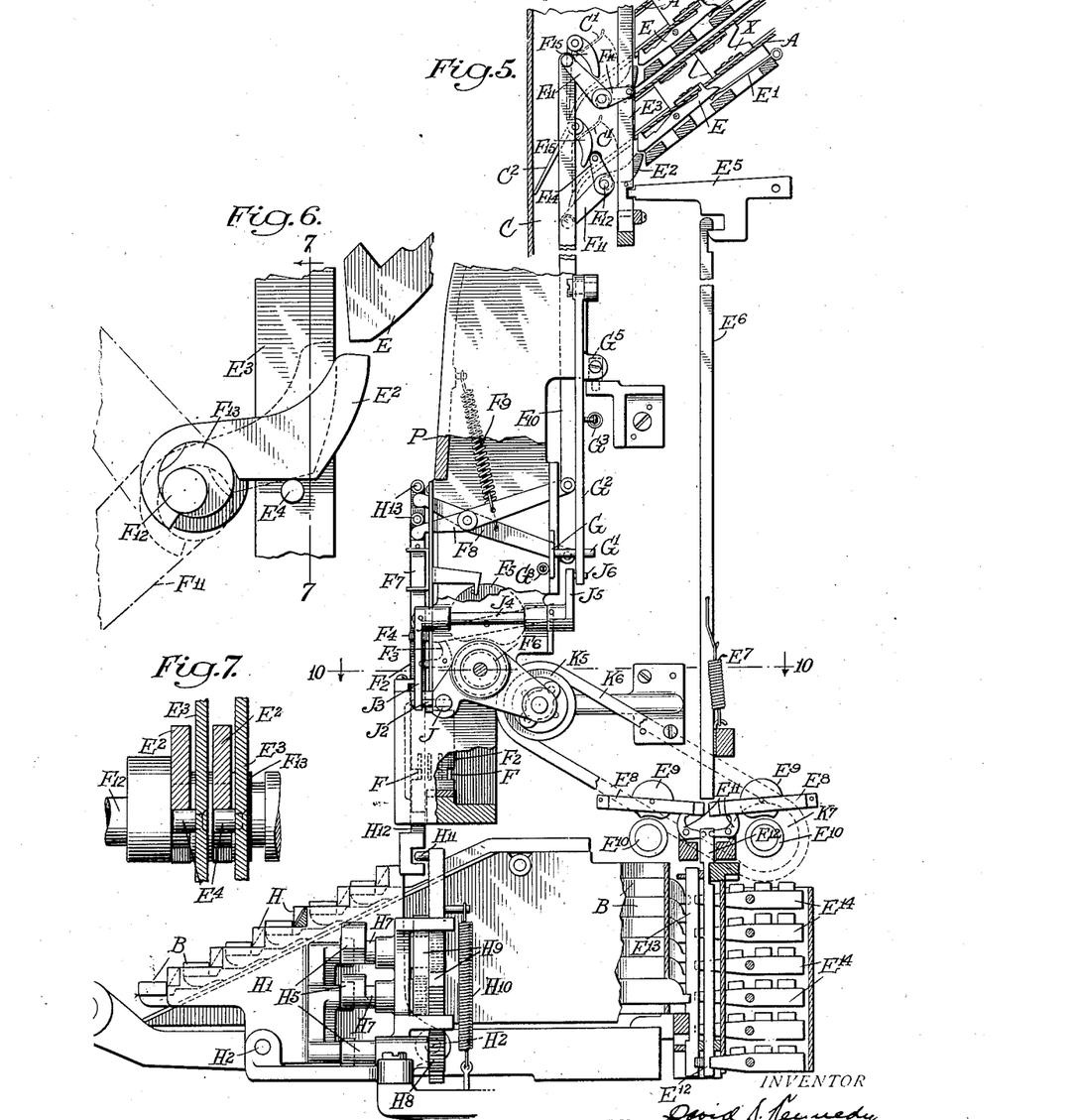
Fig. 5 is an enlarged side elevation, partly in section and partly broken away, of the keyboard mechanism and magazine selecting devices.
Fig. 6 is an enlarged view of a detail.
Fig. 7 is a section taken on the line 7—7 of Fig. 6, looking in the direction of the arrow.

In providing for the release of the matrices from the several magazines, each of the latter is provided with its own series of escapements E, one for each channel or matrix column (Fig. 5). These escapements are operated in one direction by attached springs $E^1$ and in the other direction by a single series of actuating reeds $E^3$, which latter act on the escapements through series of intermediate pivoted levers $E^2$ resting upon pins $E^4$ projecting laterally from the reeds (Figs. 6 and 7). The actuating reeds $E^3$ are in turn controlled and operated from the main keyboard B comprising as many finger keys as there are channels in an individual magazine, namely one hundred twenty six, and the keys being arranged in six banks or rows as customary. The connections between the keyboard and the escapement actuating reeds are made up, as usual, of the pivoted levers $E^5$, the upright rods $E^6$ with their attached springs $E^7$, the pivoted yokes $E^8$ carrying the rotary cams $E^9$ which are operated by the underlying power-driven rolls $E^{10}$, the trip dogs $E^{11}$ and the vertical actuating slides $E^{12}$. It may be noted that unlike the others, some of the finger keys (see Figs. 2, 5 and 10) are not engaged directly with the actuating slides $E^{12}$ but are connected thereto through the medium of short idle slides $E^{13}$ and rocking bails $E^{14}$, substantially as described and illustrated in my prior Letters Patent No. 1,347,746, so as thus to provide for the difference in width between the magazines and the keyboard as appears from Fig. 2.

The pivoted levers $E^2$ of each series are arranged to turn or rock upon a transverse supporting rod $F^{13}$ (Figs. 5 to 7) provided at its opposite ends with eccentric stub shafts $F^{12}$ journalled in suitable bearings. As thus mounted, the supporting rods $F^{13}$ when adjusted in opposite directions shift the levers $E^2$ bodily into or out of engaging relation to the corresponding series of escapements, according to the direction of adjustment. Thus, in the active position of a supporting rod, as shown by the full lines in Fig. 6, the pivoted levers $E^2$ thereon are maintained in operative relation to the corresponding escapements E, that is to say, in such position that when turned or rocked upwardly by the reeds $E^3$, their rear ends engage the escapements and actuate the same to effect the release of the controlled matrices. When, however, the supporting rod occupies its inactive position, as shown by the dotted lines said figure, the pivoted levers $E^2$ are maintained in inoperative relation to the escapements E, being held well forward of the latter so as not to engage them when rocked upwardly by the reeds $E^3$. As a result of this arrangement, by adjusting one of the supporting rods to active position and the others to inactive position, the keyboard may operatively be connected to any desired magazine to the exclusion of the others.

For effecting such adjustment of the supporting rods, it is proposed to employ power-operated means under the control of finger keys, one for each magazine. As shown particularly in Figs. 2 and 5, the stub shafts $F^{12}$ of the several supporting rods $F^{13}$ are provided at one end with crank arms $F^{11}$, connected by long rods or links $F^{10}$ to the rear ends of fore and aft intermediately pivoted levers $F^8$. These levers $F^8$ are rocked in one direction by attached springs $F^9$ and in the opposite direction by power-operated yokes $F^4$ acting through vertically guided rods $F^7$ underlying the forward ends of the levers, (see also Fig. 8). The yokes $F^4$ are of ordinary construction, carrying rotary cams $F^5$ adapted to cooperate with an underlying power-driven roll $F^6$, and are controlled in the usual way by trip dogs $F^3$ connected through vertical slides $F^2$, to finger keys F, which latter in this instance are arranged transversely above the main keyboard B and rock about a common pivot $F^1$. Cooperating with the levers $F^8$ is a locking plate G (shown in detail in Fig. 8ª), which is provided with hooks $G^6$ adapted to engage over the rear arms of said levers when the latter are rocked downwardly by the actuation of the finger keys. The locking plate G is normally held in active position by a spring $G^8$ and with the inclined ends of its hooks $G^6$ in the path of the levers $F^8$, so that as one or another of these levers is rocked downward, it displaces the locking plate from active position and passes below the corresponding hook, which then immediately snaps across the lever and holds it depressed. It is to be noted that the aforesaid displacement of the locking plate by a lever $F^8$ disengages it from any other lever which had previously been locked down and thus permits the latter lever and the connected parts to be restored to their original condition by the attached spring $F^9$. The action of the parts is as follows: In selecting any desired magazine, the corresponding finger key F is actuated to throw into operation the controlled cam yoke $F^4$ which thereupon, through the rod $F^7$, pivoted lever $F^8$, and link $F^{10}$, turns the connected supporting rod $F^{13}$ to active position, the rod being held in such active position by the engagement of the locking plate G with the rear end of the lever $F^8$. When now another key is actuated to select a different magazine, the corresponding supporting rod is turned to and locked in active position in the same way, but the actuation of this second key at the same time effects the release of the previously active supporting rod, due to the displacement of the locking plate G, and allows it to be restored to inactive position under the influence of the spring $F^9$. In other words, the arrangement is such that, whenever the supporting rod $F^{13}$ of a selected magazine is adjusted to active position, any previously active rod will be simultaneously restored to inactive position (see Fig. 5). In this way, and simply by actuating one or another of the magazine selecting keys, the keyboard may be caused to effect the release of matrices from only one magazine at a time, and that one corresponding to the particular selecting key last actuated.

In changing from one magazine to another, it is also necessary that the pivoted flaps $C^2$ be opened and closed to correspond. This is accomplished (Figs. 2 and 5) by providing each flap with a depending arm $F^{15}$ arranged in position to be engaged by an upstanding arm $F^{14}$ on the shaft $F^{12}$ of the rod $F^{13}$ for the corresponding magazine, the arrangement being such that the adjustment of the rod to active and inactive position effects the opening and closing movements of the connected flap, respectively.

Figures 10, 11:
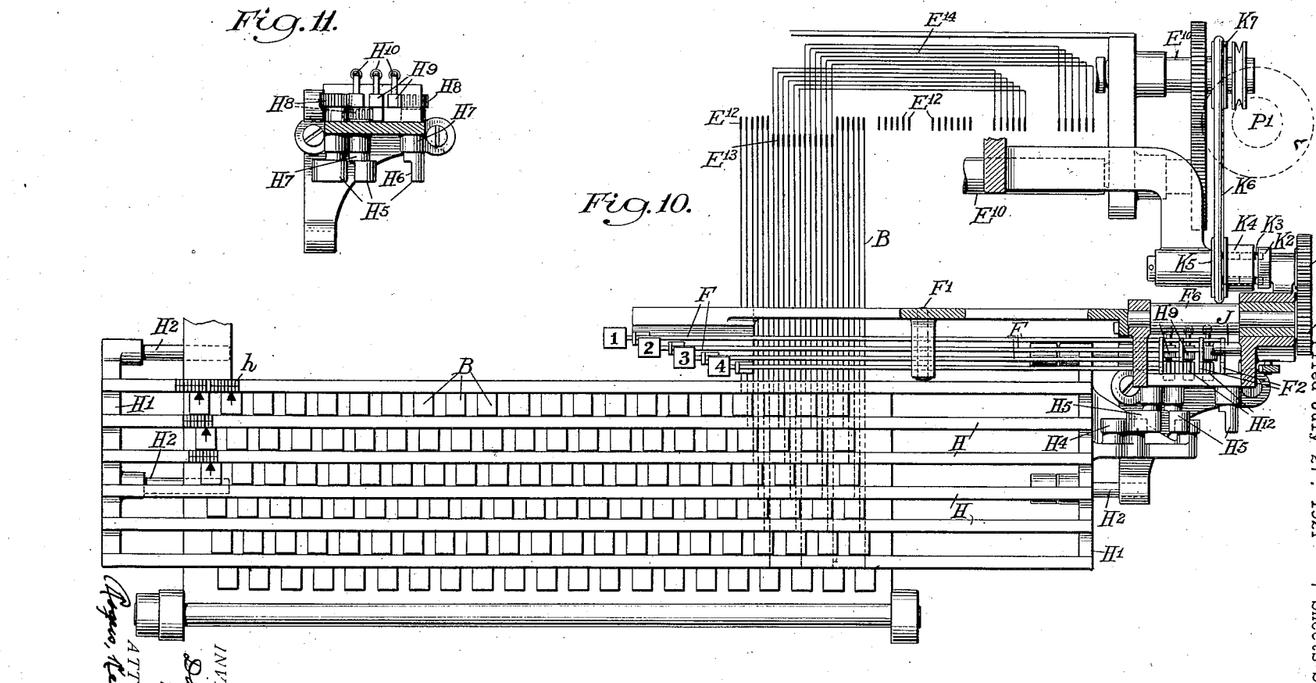
Fig. 10 is a section taken substantially on the line 10—10 of Fig. 5 looking downwardly or in the direction of the arrows, the keyboard devices being shown diagrammatically.
Fig. 11 is a detached view of a detail.

In the foregoing arrangement, it is evident that the finger keys B at one time are used to select matrices bearing certain characters and another time other matrices bearing totally different characters. In order that the finger keys may thus be employed, the keyboard is equipped with an indicator mechanism which will exhibit to the operator under any condition of adjustment the precise characters which the finger keys control. In the first embodiment to be described, such indicator mechanism comprises a series of indicator bars H extending across the keyboard from one side to the other and arranged alongside the several rows of finger keys B (Fig. 10).

Figure 9:
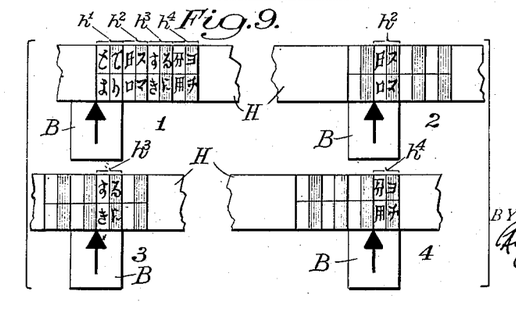
Fig. 9 is a diagrammatic view showing the different relations which exist between one of the finger keys and the associated indicator bar under different adjustments.

These indicator bars H are formed on their exposed faces with index characters $h$ representative of the various characters comprised in the whole matrix font. Like the matrices X, the index characters $h$ are divided into sets, one for each magazine, and are so arranged that, by shifting the indicator bars longitudinally in one direction or the other, any selected set of index characters may be brought into reading relation to the respective finger keys. This will be entirely clear from Fig 9, wherein an indicator bar H is shown in four different positions with reference to a single finger key B. As will be noted, the indicator bar is provided with four different groups of index characters, marked $h^1$, $h^2$, $h^3$ and $h^4$ respectively, and arranged in that order from left to right. In No. 1 position, the bar presents the group of characters $h^1$ in reading relation to the finger key (which latter is preferably provided with an arrow mark or pointer to facilitate the reading); in No. 2 position, group $h^2$; in No. 3 position, group $h^3$, and in No. 4 position, group $h^4$. The index characters in each group are arranged on the indicator bar in the same order as they appear on the matrix which they are intended to represent; that is to say, the two unshaded characters indicate the upper and lower characters on the normal edge of the matrix, whereas the two shaded characters indicate the upper and lower characters on the reverse edge of the matrix. This particular arrangement has been adopted merely as an aid to the operator in operating the chute $C^4$ and lever $C^6$ in selecting the proper character on a released matrix. It will be understood of course that the indicator bars present four groups of index characters in connection with each finger key, it being noted that the arrangement of the groups for adjoining keys is made to accord with the spacing of said keys. The groups $h^1$ of all the finger keys thus make up one set of index characters representative of the matrix characters in one magazine, and each of the other groups a similar set for each of the three remaining magazines. Hence, when any selected magazine is brought into use, it is merely necessary to adjust the indicator bars in series so as to bring the corresponding set of index characters into reading relation to the respective finger keys.

Figures 8, 8A:
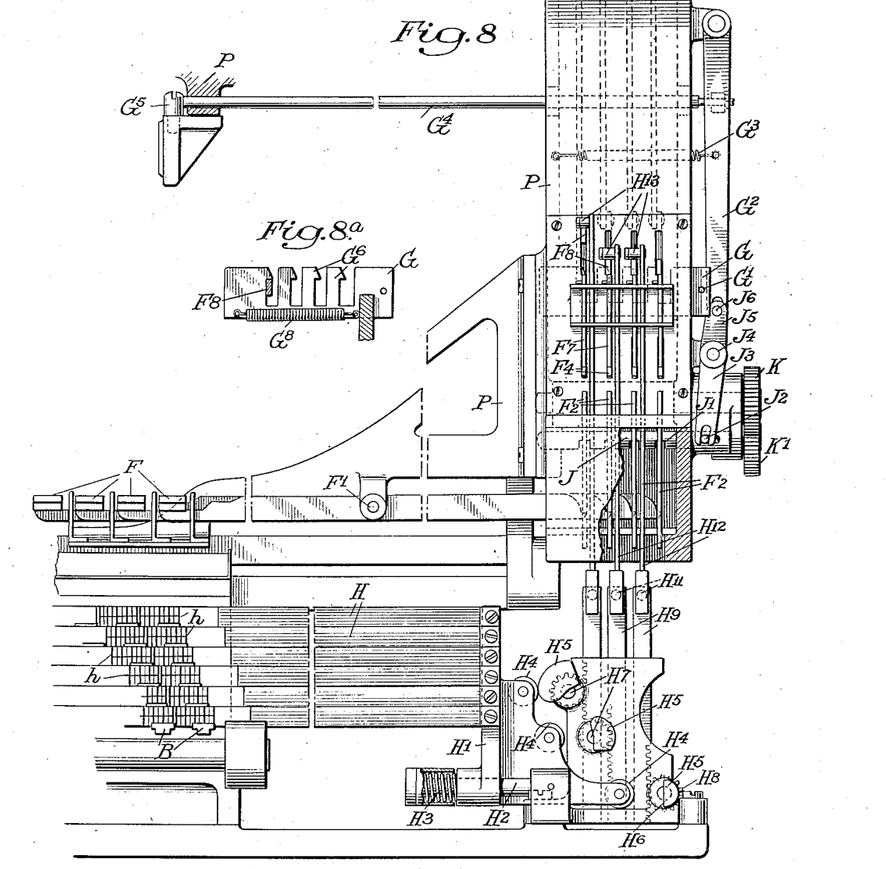
Fig. 8 is a front view of certain of the parts shown in Fig. 5, showing in particular the connections between the magazine selecting devices and the indicator mechanism for the keyboard.
Fig. 8a is detached view of the locking plate employed in connection with the magazine selecting devices.

Such adjustment of the indicator mechanism is herein effected automatically by mechanism under the control of the magazine selecting keys. As best shown in Fig. 10, the indicator bars H are attached at their opposite ends to side members $H^1$ slidably mounted upon fixed supporting rods $H^2$, the bars thus being adjustable as a whole in opposite directions to bring one or another set of index characters into use. The bars are adjusted toward the right by springs $H^3$, see Fig 8, and toward the left by three segmental peripheral cams $H^5$ co-operating with rollers $H^4$ journaled on the adjacent side member $H^1$. The uppermost cam, having the greatest throw, locates the indicator bars in No. 4 position; the intermediate cam, in No. 3 position; and the lowermost cam, in No. 2 position. When all three cams are in inactive position, the indicator bars take up No. 1 position, which is determined by the engagement of the co-operating roller $H^4$ with a straight face $H^6$ formed on the lowermost cam $H^5$ (see Figs. 2 and 8). The cams $H^5$ (Fig. 11) are attached to the forward ends of short fore-and-aft shafts $H^7$ provided at their rear ends with pinions $H^8$ meshing with vertical rack bars $H^9$, which latter are raised and lowered in turning the cams to active and inactive position, respectively. The lowering of the rack bars is effected by attached springs $H^{10}$, which tend constantly to hold the cams in inactive position, whereas the raising of the rack bars is effected by the pivoted levers $F^8$, before referred to, these parts being connected by vertical rods or links $H^{12}$ formed at their lower ends with open notches to receive pins $H^{11}$ on the rack bars (Fig. 5) and provided at their upper ends with laterally projecting pins or rollers $H^{13}$ overlaying the forward ends of the pivoted levers (Fig. 8). It may be noted that the three cams $H^5$, beginning with the largest, and connected to the levers $F^8$ of the fourth, third and second magazines, respectively, counting from the top (see Figs. 8 and 10). The lever $F^8$ for the top magazine has no direct connection to the indicator bars as none is necessary.

The action of the parts will now be clear: Assuming that all of the magazines are out of use (the condition in Fig. 2), to select the top magazine, the operator actuates No. 1 finger key, which thereupon brings about the connection of the keyboard B to that magazine in the manner previously described. In this instance, the action of the parts does not affect the indicator bars H, which are allowed to remain in No. 1 position, as shown in Fig. 2, to present the set of index characters $h^1$ in reading relation to the finger keys. If, say, No. 4 finger key be next actuated, not only is the keyboard B connected to that magazine, but the indicator bars H are simultaneously adjusted to No. 4 position to bring the corresponding set of index characters $h^4$ into reading relation to the finger keys. Thus, as shown in Fig. 8, the uppermost cam $H^5$ (the one having the greatest throw) has been operated by the raising of the connected rack bar $H^9$, due to its connection with the appropriate lever $F^8$, so as to effect the proper adjustment of the indicator bars. In this connection, it will be remembered that the locking plate G engages the rear end of the lever $F^8$ as it is rocked downwardly in the operation of the parts, so that the indicator bars H will be locked in their adjusted position until another finger key is actuated to select a different magazine. Since the actuation of such further finger key will disengage the locking plate G from the pivoted lever $F^8$, the uppermost cam $H^5$ will be immediately restored to its original inactive position by the depression of the connected rack bar $H^9$ under the influence of the attached spring $H^{10}$. The same action of the parts which thus restores the uppermost cam to inactive position will, in the case of the No. 2 or No. 3 finger key, bring into action one or the other of the two remaining cams, according to which key is actuated, and thus locate the indicator bars in position to bring the corresponding set of index characters into use. When No. 1 finger key is actuated after any one of the three other magazine selecting keys, the previously operative cam $H^5$ will simply be restored to inactive position to allow the indicator bars to occupy No. 1 position as determined by the straight face $H^6$ of the lowermost cam. It will be seen, therefore, that the cams $H^5$ are operated in much the same way as the adjusting rods $F^{13}$, that is to say, when one cam is turned to active position by the actuation of the corresponding magazine selecting key, any previously active cam will be turned to inactive position, except in the case of No. 1 finger key whose actuation merely serves to restore a previously active cam to inactive position without bringing a new cam into action. The effect of the whole arrangement is that, whenever any selected magazine is brought into use, the indicator mechanism will be automatically adjusted to correspond, each change of magazine involving a change of index characters for the finger keys.

Figure 12:
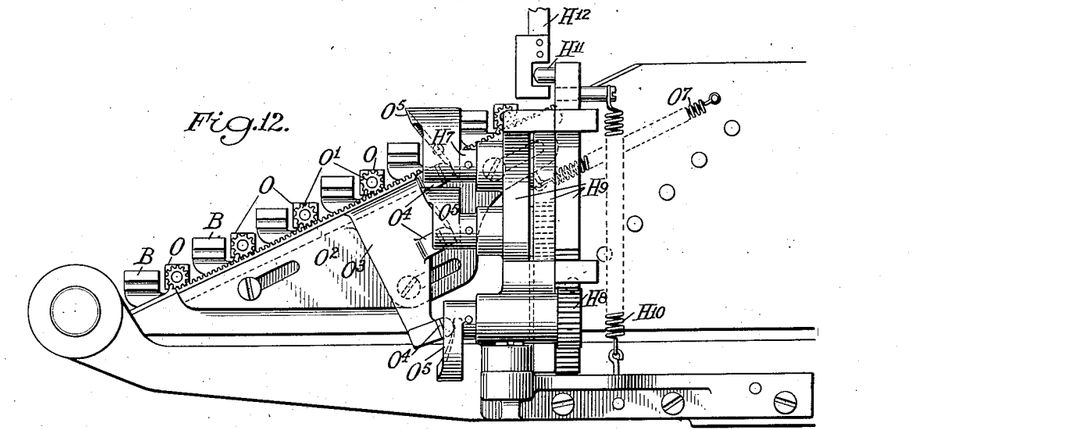
Figs. 12, 13 and 14 illustrate a modification of the indicator mechanism, Fig. 12 being a side view and Fig. 13 a plan view of the parts, and Fig. 14 showing one of the indicator bars in its different positions.
Figures 13, 14:
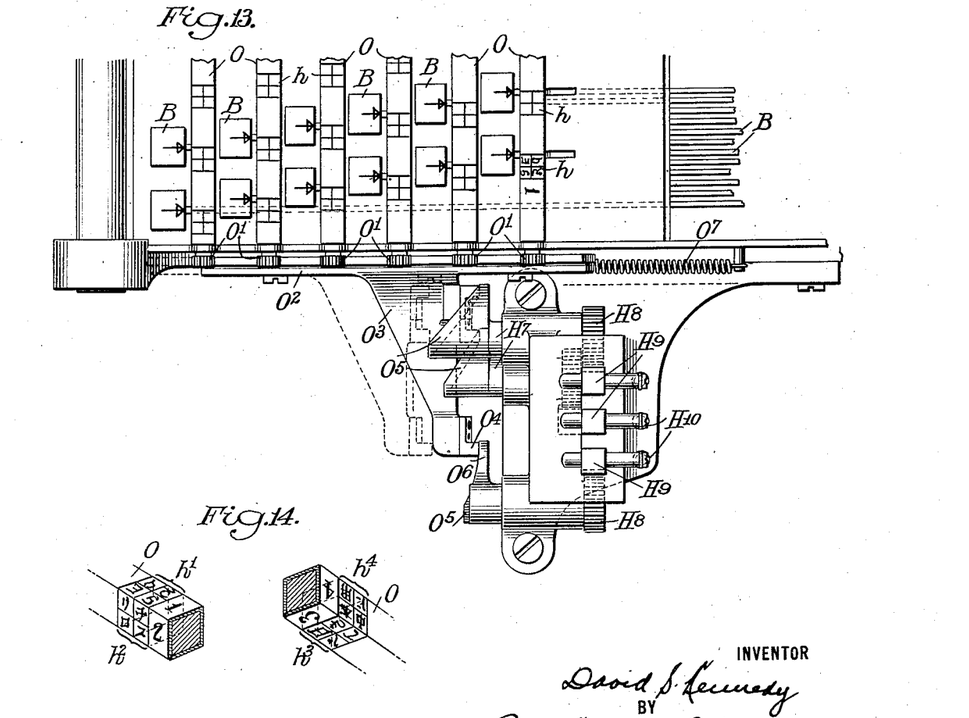

Figs. 12, 13 and 14 illustrate a modified or alternative form of indicator mechanism. In this embodiment, the indicator bars O present four distinct faces whereon the sets of index characters $h^1$, $h^2$, $h^3$, $h^4$, are respectively arranged (see Fig. 14), and these bars are mounted in suitable bearings on the keyboard frame so as to be rotatable or adjustable to four different positions to bring any desired set of index characters into reading relation to the respective finger keys. Such adjustment of the indicator bars is effected by a common shift frame $O^2$ slidable fore-and-aft on the keyboard frame and provided at its upper edge with rack teeth meshing with pinions $O^1$ fixed to the shafts of the several indicator bars. The frame $O^2$ is moved rearwardly by a spring $O^7$ and in the opposite direction by variable throw face cams $O^5$ cooperating with studs $O^4$ carried by an arm $O^3$ projecting laterally from the frame. These cams $O^5$ are mounted and operated in precisely the same way as the cams $H^5$ of the first embodiment. Like the corresponding cam $H^5$, the lowermost cam $O^5$ is formed with a straight portion $O^6$ which determines the setting of the indicator bars O in No. 1 position as required when No. 1 finger key F is actuated to select the top magazine. When any one of the other magazine selecting keys is actuated, the corresponding cam $O^5$ is rotated and, through the shift frame $O^2$, turns the indicator bars O in series to bring one or another set of index characters into use, according to the magazine selected.

In order to permit the removal of the magazines, and to give access to the interior parts, practically the whole of the assembling and magazine selecting devices are mounted in a swinging frame P which is pivoted at one side of the machine, as at $P^1$ (Fig. 2). That is to say, the channeled raceway C with its throats $C^1$, flaps $C^2$, assembler belt $C^3$ and adjustable chute $C^4$; the escapement actuating reeds $E^3$ and pivoted levers $E^2$; the adjustable rods $F^{13}$ and their various operating connections, including the power-driven roll $F^6$; are all mounted upon the frame P, so that the entire structure may be swung outwardly to one side of the magazines during their removal.

In order that the frame P may be freely moved at any time, the driving connections for the power driven roll $F^6$ are arranged to be made broken as the frame is swung to and from its operative position. As best shown in Fig. 10, the shaft of the roll $F^6$ carries a driven pinion K meshing with a similar pinion $K^1$ fixed to one end of a short counter shaft which carries at its opposite end a clutch member $K^2$ formed with holes or apertures to receive pins $K^3$ of a cooperating clutch member $K^4$. The pinions K, $K^1$ and the clutch member $K^2$, are mounted in the swinging frame P; whereas the clutch member $K^4$ is fixed to a driving pulley $K^5$ mounted independently of the frame or in the fixed framework of the machine. By reason of this construction, the two clutch members $K^2$ and $K^4$ are automatically engaged and disengaged in the swinging movements of the frame P, it being noted that the disengagement of the clutch members takes place during the initial opening movement of the frame and their engagement or reengagement during the final closing movement thereof. The pulley $K^5$ is connected by a belt $K^6$ to a similar pulley $K^7$ attached to one of the keyboard rolls $E^{10}$, which latter are constantly driven in the usual way.

When the swinging frame P is opened, it is desirable that the supporting rods $F^{13}$, flaps $C^2$, and indicator bars H be restored to their normal positions; and means are therefore provided to that end. Referring to Figs. 2, 5 and 8, such means include a long lever $G^2$ pivoted at its upper end to the frame P and having its lower end arranged in position to engage a pin $G^1$ projecting rearwardly from the locking plate G. Between its ends, the lever $G^2$ has connected to it a spring $G^3$ which tends constantly to move it to the left and hold the locking plate G in unlocking position against the action of the inferior spring $G^8$. In the normal condition of the parts, this tendency of the spring $G^3$ is resisted and overcome by a horizontal rod $G^4$ carried by the frame P and connected at one end to the lever $G^2$ and abutting at its opposite end against a stop pin $G^5$ mounted on the fixed frame work. Consequently, when the frame P is moved from its operative position, the rod $G^4$ is immediately disengaged from the stop pin $G^5$ and thus enables the spring $G^3$ to shift the locking plate G to unlocking position, thereby releasing any active supporting rod $F^{13}$, which is then restored to inactive position by the attached spring $F^9$, and at the same time releasing any active adjusting cam $H^5$ or $O^5$ which likewise is restored to inactive position by the attached spring $H^{10}$. Similarly, the return of the supporting rod to inactive position allows the corresponding flap $C^2$ to move to closed position. When the frame P is subsequently restored to its operative position, the rod $G^4$, by its engagement with the stop $G^5$, is pushed to the right against the action of the spring $G^3$ and breaks the engagement of the lever $G^2$ with the locking plate G, which is then free to return to active position under the influence of the weaker spring $G^8$.

Means are also provided to prevent the actuation of the magazine selecting keys F except when the frame P is in its operative position. In the present embodiment, such means comprise a locking rod J (Fig. 8) overlying the shouldered portions of the slides $F^2$ and formed with recesses $J^1$ which are adapted to be shifted into and out of alignment with the slides by the longitudinal adjustment of the rod. Such adjustment of the locking rod (Fig. 5) is effected by the lever G², before referred to, through the medium of a rock shaft J⁴ provided with oppositely extending arms J³, J⁵, connected by pin and slot devices J², J⁶, to the rod and lever, respectively. As a result of this arrangement, when the frame P is swung outwardly from its operative position, the lever G², by its movement toward the left under the action of the spring G³, adjusts the locking rod J toward the right to locate its recesses J¹ out of alignment with the slides F², thereby locking the finger keys F against actuation, whereas, when the frame is subsequently restored to operative position, the lever G², by its movement toward the right under the action of the rod G⁴ and stop pin G⁵, adjusts the locking rod J toward the left to locate its recesses J¹ in alignment with the slides F², thereby releasing the finger keys for actuation.

Attention is also called to the fact that, in both embodiments of the indicator mechanism, the pin and slot connections H¹¹ between the rack bars H⁹ and rods H¹² are intended to provide for the making and breaking of the connections between these parts as the frame P is swung to and from its operative position, it being noted that the rods H¹² are carried by the swinging frame, whereas the other parts are supported independently thereof or in the fixed framework.

Figures 3, 4:
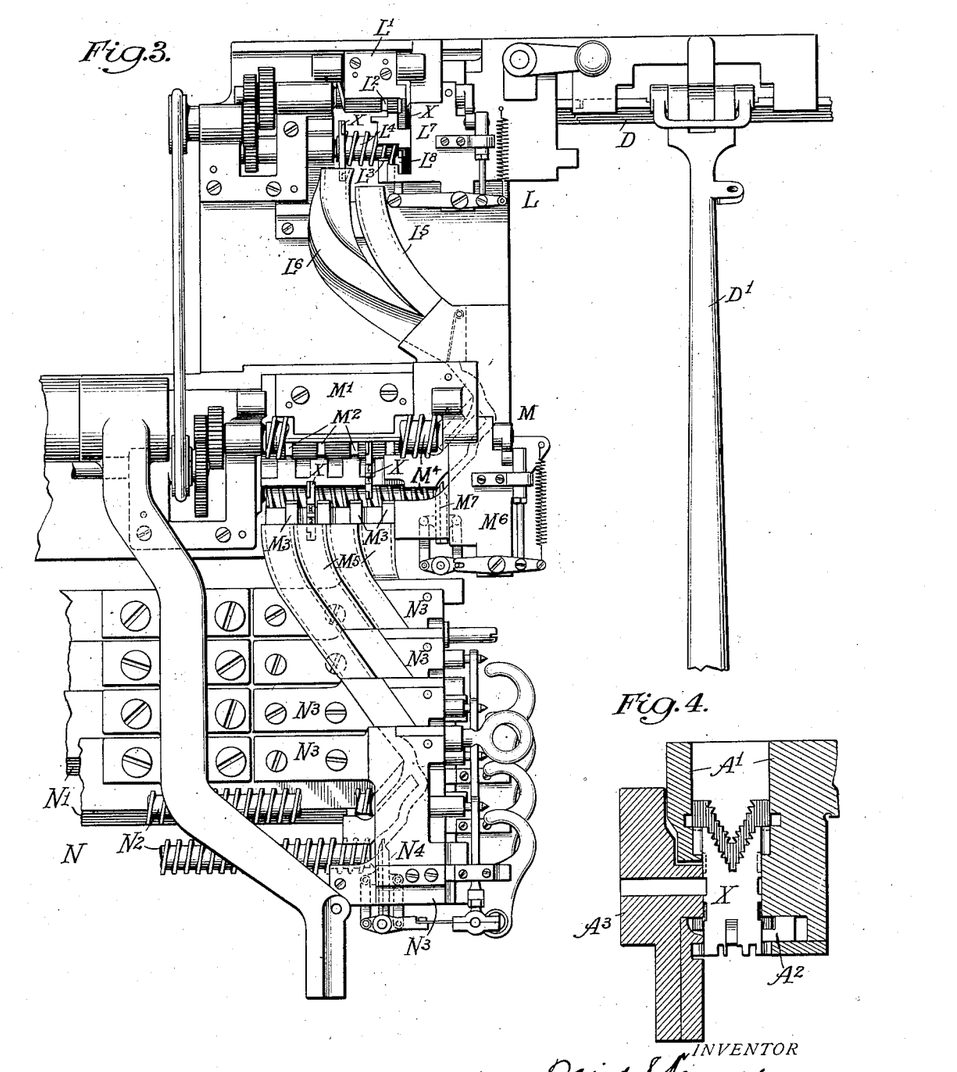
Fig. 3 is a rear enlarged view of the entire distributing apparatus.
Fig. 4 is a vertical section taken through the mold and the composed matrix line and showing these parts in casting relation.

No change has been made in the casting mechanism, which therefore may be the same as embodied in the commercial linotype machine or as described and illustrated in the Rogers Reissue Patent No. 13489, above referred to. After composition (Fig. 2), the matrix line is transferred from the assembling elevator C⁵ to the so-called first elevator A¹, which latter is constructed to support the matrices at different levels therein, as usual. Upon receipt of the matrix line, the elevator A¹ descends and presents it in casting relation to the mold A³ (see Fig. 4), thereafter rising to its uppermost position to permit the transfer of the line therefrom. As is well known, the matrices standing at the upper level in the first elevator are sustained by the retractable blade or rail A², which is automatically withdrawn as the elevator assumes its uppermost position to permit the matrices standing at the upper level to drop to the lower level.

Figure 1:
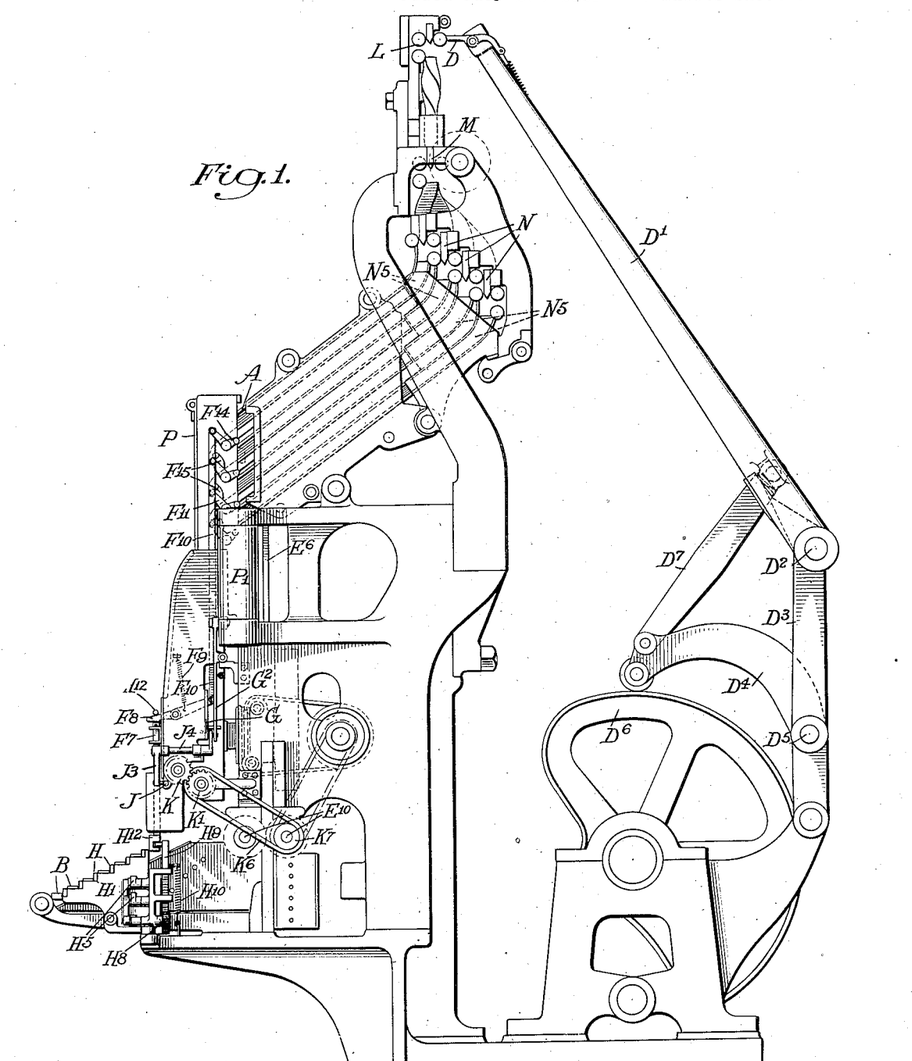
Fig. 1 is a side elevation of a linotype machine equipped with the various improvements.

From the first elevator A¹, the matrices (now occupying a common level) are transferred onto the second elevator bar D (Fig. 3), which is carried upward by the lever D¹ to deliver the matrices to the distributing apparatus. As shown in Fig. 1, the lever D¹ is pivotally mounted upon a shaft D² supported in an elevated position by a fixed bracket D³. The operation of the lever D¹ is controlled by the rotary cam D⁶ fixed to the main shaft of the machine and arranged to cooperate with the free end of a second lever D⁴ pivoted to the supporting bracket at D⁵ and connected to the lever D¹ through the link D⁷. Ordinarily, the link D⁷ is connected directly to the lever D¹, but in the present embodiment, the connection is of a yielding nature as shown to insure the location of the elevator bar D in proper delivery position.

The distributing apparatus herein employed is intended to cooperate simultaneously with all of the magazines and return the matrices thereto in their original or unreversed condition. Such apparatus, in the present embodiment, comprises three cooperating mechanisms L, M, and N, arranged to act upon the matrices in that order (see Figs. 1 and 3). The initial mechanism L acts to separate reversed from unreversed matrices and restore the former to their original condition. This mechanism is the same as disclosed in my prior Patent No. 1,153,499, before referred to, and comprises the ribbed bar L¹ formed with a blank portion L² at one point in its length, a selector bridge L³ underlying the blank portion L² and adapted to cooperate with the notches X³ in the lower edges of the matrices, the conveyor screws L⁴, and the delivery tubes L⁵ and L⁶, the former tube being straight or plain to permit the passage of the matrices therethrough without reversal, and the latter tube being rifled or twisted to effect the reversal of the matrices in their passage therethrough. As the matrices X are carried along the bar L¹ they become disengaged therefrom at the blank portion L², at which point the unreversed matrices, whose notches X³ register with the underlying selector bridge L³, fall away from the bar and are subsequently dropped into the plain delivery tube L⁵, while the reversed matrices, whose notches X³ fail to register with the bridge L³, are caused to engage with the further ribbed portion of the bar L¹ and are therefore carried along the same until they drop from the end thereof, whence they fall into the twisted or rifled tube L⁶. The matrices are fed to the screws L⁴, one at a time, by the customary lifting finger L⁸ of the distributor box L⁷, which latter as well understood receives the matrices from the second elevator bar D. The intermediate mechanism M is intended to sort the matrices according to set and is substantially the same as embodied in the commercial Model 9 linotype, or as disclosed in the Rogers U. S. Patent No. 890,303. As herein shown, the mechanism comprises the ribbed bar M¹ formed with blank portions M² at different portions in its length, the selector bridges M³ underlying the blank portion M² and adapted to cooperate with the differently located notches X⁴ of the matrices, the conveyor screws M⁴, and the plain delivery tubes M⁵, these parts functioning in the well-known manner to sort the matrices into sets, one for each magazine. The matrices are delivered to the intermediate mechanism from the tubes L⁵ and L⁶ of the initial mechanism, both of said tubes discharging the matrices in their original or unreversed condition into the separator box M⁶, from which they are fed, one at a time, to the conveyor screws M⁴ under the control of the alternately acting pawls M⁷. The final mechanism N distributes the matrices of the respective sets according to character and returns them to their proper channels in the corresponding magazines. This mechanism is also the same as embodied in the commercial Model 9 linotype, being made up of the customary permuted bars or rails N¹ and conveyor screws N². The bars N¹ are formed as usual with suitable combinations to cooperate with the tooth combinations X² of the matrices in releasing the latter at different points according to character. When released, the matrices pass through the channeled magazine entrances N⁵ (Fig. 1) into the proper channels of the magazine to which they belong. The matrices are fed onto the respective distributing bars N¹, by the pawls N⁴ of the separator boxes N³, which latter receive the matrices of the respective sets from the delivery tubes M⁵ of the intermediate mechanism. While each of the foregoing distributing mechanisms is old per se, this is believed to be the first instance in which they have been combined to bring about the new result noted.

As previously stated, the invention has been shown only in preferred form and by way of example and as applied to the particular kind of machine described, but obviously many modifications and alterations therein and in its mode of adaptation will suggest themselves to those skilled in the art and still be comprised within its scope. It should also be noted that while the various features described are closely related and mutually cooperate to bring about the desired results, many of them might be used alone or in connection with other features to good advantage.

Having thus described my invention, its construction and mode of operation, what I claim is as follows:

1. In a typographical composing and distributing machine equipped with a font of matrices divided into a plurality of sets, the combination of a corresponding plurality of channeled magazines wherein the respective matrix sets are stored, a distributing apparatus cooperating with all of the magazines simultaneously, a keyboard having only as many finger keys as there are channels in an individual magazine, means for operatively connecting the keyboard to any selected one of the several magazines, an indicator mechanism associated with the keyboard and comprising a plurality of sets of index characters, one set for each magazine, and automatic means for adjusting the indicator mechanism to bring one or another set of index characters into use according to the magazine selected.

2. In a typographical composing and distributing machine equipped with a font of Janus-faced matrices divided into a plurality of sets, the combination of a corresponding plurality of channeled magazines wherein the respective matrix sets are stored, assembling mechanism cooperating with the magazines and including matrix reversing means adjustable to operative or inoperative position as desired, a keyboard having only as many finger keys as there are channels in an individual magazine, means for operatively connecting the keyboard to any selected one of the several magazines, an indicator mechanism associated with the keyboard and presenting a plurality of sets of index characters, one set for each magazine, automatic means for adjusting the indicator mechanism to bring one or another set of index characters into use according to the magazine selected, and a distributing apparatus cooperating with all of the magazines simultaneously and acting to restore the matrices thereto in their original or unreversed condition.

3. In a typographical composing machine, the combination of a plurality of matrix magazines, a keyboard, means for operatively connecting the keyboard to any selected magazine, and an indicator mechanism associated with the keyboard and adjustable to correspond with the selected magazine 4. In a typographical composing machine, the combination of a plurality of matrix magazines, a keyboard, means for operatively connecting the keyboard to any selected magazine, an adjustable indicator mechanism associated with the keyboard, an automatic means for adjusting the indicator mechanism to correspond with the selected magazine.

5. In a typographical composing machine, the combination of a plurality of magazines containing matrices, those of one magazine bearing different characters from those of another, a keyboard, means for operatively connecting the keyboard to any selected magazine, and an indicator mechanism associated with the keyboard and presenting a plurality of sets of index characters, one set for each magazine, the said indicator mechanism being adjustable to bring one or another set of index characters into use according to the magazine selected.

6. In a typographical composing machine, the combination of a plurality of magazines containing matrices, those of one magazine bearing different characters from those of another, a keyboard, means for operatively connecting the keyboard to any selected magazine, an indicator mechanism associated with the keyboard and presenting a plurality of sets of index characters, one set for each magazine, and automatic means for adjusting the indicator mechanism to bring one or another set of index characters into use according to the magazine selected.

7. In a typographical composing machine, the combination of a plurality of stationary magazines containing matrices, those of one magazine bearing different characters from those of another, a corresponding plurality of series of matrix releasing escapements, a common series of actuating reeds for the several series of escapements, means for operatively connecting the actuating reeds to the escapements of any selected magazine, a keyboard controlling the operation of said actuating reeds, an indicator mechanism associated with the keyboard and presenting a plurality of sets of index characters, one set for each magazine, and automatic means for adjusting the indicator mechanism to bring one or another set of index characters into use according to the magazine selected.

8. In a typographical composing machine, the combination with a plurality of stationary magazines containing matrices, those of one magazine bearing different characters from those of another, a corresponding plurality of series of matrix releasing escapements, a common series of actuating reeds, a keyboard controlling the operation of said actuating reeds, pivoted levers for transmitting motion from the actuating reeds to the corresponding escapements of the respective magazines, supporting rods upon which the pivoted levers are arranged to turn and each adjustable to establish an operative or inoperative relation between its pivoted levers and the corresponding series of escapements, and means for adjusting said supporting rods so as to select any desired magazine for use, of an indicator mechanism associated with the keyboard and presenting a plurality of sets of index characters, one set for each magazine, and connections whereby the mechanical selection of the desired magazine automatically adjusts the indicator mechanism to bring the corresponding set of index characters into use.

9. In a typographical composing machine, the combination with a plurality of stationary magazines containing matrices, those of one magazine bearing different characters from those of another, a corresponding plurality of series of matrix releasing escapements, a common series of actuating reeds, a keyboard controlling the operation of said actuating reeds and comprising a series of finger keys arranged in rows, pivoted levers for transmitting motion from the actuating reeds to the corresponding escapements of the respective magazines, supporting rods upon which the pivoted levers are arranged to turn and each adjustable to establish an operative or inoperative relation between its pivoted levers and the corresponding series of escapements, and means for adjusting said supporting rods so as to select any desired magazine for use, of adjustable indicator bars extending alongside the rows of finger keys and bearing a plurality of sets of index characters, one set for each magazine, and connections whereby the mechanical selection of the desired magazine automatically adjusts the indicator bars to bring the corresponding set of index characters into reading relation to the respective finger keys.

10. In a typographical composing machine, the combination of a plurality of magazines containing matrices, those of one magazine bearing different characters from those of another, means for selecting any desired magazine for use, a keyboard controlling the release of matrices from the selected magazine, an indicator mechanism associated with the keyboard and presenting a plurality of sets of index characters, one set for each magazine, and means controlled by the magazine selecting means for adjusting the indicator mechanism to bring one or another set of index characters into use according to the magazine selected.

11. In a typographical composing machine, the combination of a plurality of magazines containing matrices, those of one magazine bearing different characters from those of another, means for selecting any desired magazine for use, a keyboard controlling the release of matrices from the selected magazine and comprising a series of finger keys arranged in rows, adjustable indicator bars arranged alongside the rows of finger keys and presenting a plurality of sets of index characters, one set for each magazine, and operative connections between the magazine selecting means and the indicator bars whereby the latter are automatically adjusted to bring one or another set of index characters into reading relation to the respective finger keys according to the magazine selected.

12. In a typographical composing machine, the combination of a plurality of magazines containing matrices, those of one magazine bearing different characters from those of another, assembling mechanism co-operating with the magazines, a movable supporting frame carrying the assembling mechanism, means also carried by the supporting frame for selecting one or another of the magazines for use, a keyboard mounted independently of the supporting frame and controlling the release of matrices from the selected magazine, an indicator mechanism for the keyboard also mounted independently of the supporting frame and presenting a plurality of sets of index characters, one set for each magazine, and operative connections between the indicator mechanism and the magazine selecting means, the said connections being arranged to be made and broken as the supporting frame is moved to and from operative position.

13. The combination with a keyboard comprising a series of finger keys arranged in rows, of adjustable indicator bars extending alongside the rows of finger keys and bearing a plurality of sets of index characters, and means for adjusting the indicator bars to bring any desired set of index characters into reading relation to the respective finger keys.

14. The combination with a keyboard comprising a series of finger keys arranged in rows, of adjustable indicator bars extending alongside the rows of finger keys and bearing a plurality of sets of index characters, and means for adjusting the indicator bars to bring any desired set of index characters into reading relation to the respective finger keys, the said means including a plurality of selecting keys, one for each set of index characters, and devices controlled by said keys for effecting the proper adjustment of the indicator bars.

15. The combination with a keyboard comprising a series of finger keys arranged in rows, of adjustable indicator bars extending alongside the rows of finger keys and bearing a plurality of sets of index characters, and means for adjusting the indicator bars to bring any desired set of index characters into reading relation to the respective finger keys, the said means including a plurality of selecting keys, one for each set of index characters, and power-operated devices controlled by said keys for effecting the proper adjustment of indicator bars.

16. The combination with a keyboard comprising a series of finger keys arranged in rows, of adjustable indicator bars extending alongside the rows of finger keys and bearing a plurality of sets of index characters, and means for adjusting the indicator bars to bring any desired set of index characters into reading relation to the respective finger keys, the said means including a shiftable frame connected to the indicator bars, and variable-throw devices for shifting the frame to different extents in effecting the adjustment of the indicator bars for different sets of index characters.

17. The combination with a finger key, of an independent indicator located adjacent the finger key and bearing index characters, said indicator being adjustable to bring different index characters into reading relation to the finger key.

18. The combination with a plurality of finger keys, of a common indicator bar associated therewith and bearing index characters, the said indicator bar being adjustable to bring different index characters into reading relation to the respective finger keys.

19. In a typographical composing machine, the combination of a plurality of magazines each provided with a series of escapements, a common series of key-controlled actuating reeds, a plurality of series of intermediate pivoted levers for transmitting motion from the reeds to the corresponding escapements, eccentrically mounted supporting rods upon which the pivoted levers of the respective series are arranged to turn and each adjustable to active or inactive position to shift its pivoted levers into or out of operative relation to the corresponding series of escapements, and means whereby the adjustment of one supporting rod to active position effects the adjustment of another to inactive position.

20. In a typographical composing machine, the combination of a plurality of magazines each provided with a series of escapements, a common series of key-controlled actuating reeds, a plurality of series of intermediate pivoted levers for transmitting motion from the reeds to the corresponding escapements, eccentrically mounted supporting rods upon which the pivoted levers of the respective series are arranged to turn and each adjustable to active or inactive position to shift its pivoted levers into or out of operative relation to the corresponding series of escapements, a plurality of selecting keys or equivalent devices, one for each magazine, and means controlled by said keys for adjusting one of said supporting rods to active position and another to inactive position, according to the key actuated.

21. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, manually controlled operating devices for adjusting the supporting rods to active position, and means for locking the rods in such position, said locking means acting to release a previously active supporting rod when another is adjusted to active position.

22. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, and means whereby the adjustment of one supporting rod to active position effects the adjustment of another to inactive position, with a channeled raceway having throats arranged in register with the respective magazines, at least one of said throats being provided with a movable flap to open and close the passage between it and the raceway, and connections between the movable flap and the supporting rod of the corresponding magazine whereby the adjustment of said rod to active and inactive position effects the opening and closing movement of said flap, respectively.

23. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, a movable supporting frame carrying the assembling mechanism, and automatic means to insure the location of all of the supporting rods in inactive position when the supporting frame is moved from its operative position.

24. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, and means whereby the adjustment of one supporting rod to active position effects the adjustment of another to inactive position, with a movable supporting frame carrying the assembling mechanism, and automatic means for restoring an active supporting rod to inactive position when the supporting frame is moved from its operative position.

25. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, manually controlled operating devices for adjusting the supporting rods to active position, and means for locking the rods in such position, said locking means acting to release a previously active supporting rod when another is adjusted to active position, with a movable supporting frame carrying the assembling mechanism, and automatic means for disengaging the aforesaid locking means when the supporting frame is moved from its operative position so as thus to insure the return of any active supporting rod to inactive position at such time.

26. In a typographical composing machine, the combination of a magazine provided with a series of escapements, a series of key-controlled actuating reeds, intermediate pivoted levers for transmitting motion from the reeds to the corresponding escapements, and means for shifting said levers positively to operative or inoperative position, as required.

27. In a typographical composing machine, the combination of a magazine provided with a series of escapements, a series of key-controlled actuating reeds, intermediate pivoted levers for transmitting motion from the reeds to the corresponding escapements, and a supporting rod upon which the pivoted levers are arranged to turn, said rod being mounted eccentrically and adjustable to shift the pivoted levers to operative or inoperative position as required.

28. In a typographical composing machine, the combination of an escapement, a finger key, and connections between the finger key and escapement, said connections including a pivoted lever mounted to be shifted into or out of engaging relation to the escapement when the parts are at rest.

29. In a typographical composing machine, the combination of an escapement, a key-controlled actuating reed, an intermediate pivoted lever for transmitting motion from the latter to the former, and an eccentrically mounted supporting rod upon which the pivoted lever is arranged to turn and adjustable angularly to shift said lever to operative or inoperative position, as required.

30. In a typographical composing machine, the combination of an escapement, a vertically movable actuating reed provided with a laterally projecting pin, an intermediate pivoted lever resting on said pin, and an eccentrically mounted supporting rod upon which the pivoted lever is arranged to turn, said supporting rod being adjustable angularly to shift the pivoted lever into and out of engaging relation to the escapement.

31. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, a movable supporting frame carrying the assembling mechanism, automatic means to insure the location of the supporting rods in inactive position when the supporting frame is moved from its operative position, and automatic locking means to prevent the adjustment of the supporting rods to active position until the supporting frame is restored to its operative position.

32. In a typographical composing machine, the combination of a plurality of magazines each provided with a series of escapements, a common series of key-controlled actuating reeds, a plurality of series of intermediate pivoted levers for transmitting motion from the reeds to the corresponding escapements, supporting rods upon which the pivoted levers of the respective series are arranged to turn and each adjustable to active or inactive position to establish an operative or inoperative relation between its pivoted levers and the corresponding series of escapements, a movable supporting frame carrying the assembling mechanism, and automatic locking means for preventing the adjustment of the supporting rods to active position except when the supporting frame is in its operative position.

33. In a typographical composing machine, the combination of a plurality of magazines, assembling mechanism cooperating therewith, a movable supporting frame carrying the assembling mechanism, means for selecting one or another of the magazines for use, and means for preventing the operation of said magazine selecting means except when the supporting frame is in its operative position.

34. In a typographical composing machine, the combination of a plurality of magazines, assembling mechanism cooperating therewith, a movable supporting frame carrying the assembling mechanism, a plurality of selecting keys or equivalent devices, one for each magazine, and automatic means for locking said selecting keys against actuation when the supporting frame is moved from its operative position.

35. In a typographical composing machine, the combination of a plurality of magazines, assembling mechanism cooperating therewith, a movable supporting frame carrying the assembling mechanism, means for selecting one or another of the magazines for use, including power-operated devices and finger keys controlling the operation thereof, and automatic means for locking the finger keys against actuation when the supporting frame is moved from its operative position.

36. In a typographical composing machine, the combination of a plurality of magazines, assembling mechanism cooperating therewith, a movable supporting frame carrying the assembling mechanism, magazine selecting means carried by the supporting frame and including power-operated devices and finger keys controlling the operation thereof, and automatic locking means for preventing the actuation of the finger keys except when the supporting frame is in its operative position.

37. In a typographical composing machine, the combination of a plurality of magazines, assembling mechanism cooperating therewith, a movable supporting frame carrying the assembling mechanism, magazine selecting means including a power-driven roll carried by the supporting frame, driving means mounted independently of the supporting frame, and connections between the driving means and power-driven roll adapted to be made and broken as the supporting frame is moved to and from its operative position.

38. In a typographical composing machine, the combination of a plurality of magazines, assembling mechanism cooperating therewith, a movable supporting frame carrying the assembling mechanism, magazine selecting means including a power-driven roll carried by the supporting frame, and driving connections for the power-driven roll, the said connections including a pair of cooperating clutch members, one carried by the supporting frame, and the other mounted independently thereof, and the two said clutch members arranged to be engaged and disengaged as the supporting frame is moved to and from its operative position.

39. In a typographical composing and distributing machine, the combination of a plurality of matrix magazines, assembling mechanism cooperating therewith and including matrix reversing means adjustable to operative or inoperative position as desired, and distributing apparatus cooperating with all of the magazines simultaneously, said apparatus including mechanism for first separating reversed from unreversed matrices and restoring the former to their original condition, mechanism for thereafter sorting the matrices into sets, one for each magazine, and mechanism for finally distributing the matrices of the respective sets according to character for return to their proper channels in the corresponding magazines.

40. In a typographical composing and distributing machine, the combination of a plurality of matrix magazines, assembling mechanism co-operating therewith and including means for composing the matrices in line in reversed or unreversed position, and distributing apparatus co-operating with all of the magazines simultaneously, said apparatus including the following elements: a final mechanism for distributing the matrices according to character and presenting a plurality of permuted bar or rails; an intermediate mechanism for sorting the matrices according to set and comprising a ribbed bar formed with blank portions at different points in its length, a plurality of selector bridges underlying the blank portions of the bar, and delivery tubes leading to the respective permuted bars of the final mechanism; and an initial mechanism for separating reversed and unreversed matrices and restoring the former to their original condition, said mechanism including a ribbed bar formed with a blank portion at one point in its length, a selector bridge underlying said portion, and a pair of delivery tubes both leading to the intermediate mechanism, one of said tubes being plain and the other rifled.

41. In a typographical composing and distributing machine equipped with a font of Janus-faced matrices, each formed with three distinct distributing combinations, the first controlling the separation of reversed from unreversed matrices, the second the sorting of the matrices into a plurality of sets, and the third the distribution of the matrices in each set according to character, the combination of a plurality of magazines containing said matrices, assembling mechanism cooperating with the magazines and including means for composing the matrices in line in reversed or unreversed position, and distributing apparatus cooperating with all of the magazines simultaneously and acting to distribute the matrices into the appropriate channels of one or another of the magazines according to their said distributing combinations.

In testimony whereof, I have affixed my signature hereto.

DAVID S. KENNEDY.